G. W. POILLON.
ICE CREAM FREEZER.
APPLICATION FILED MAR. 2, 1908.
954,411.
Patented Apr. 5, 1910.
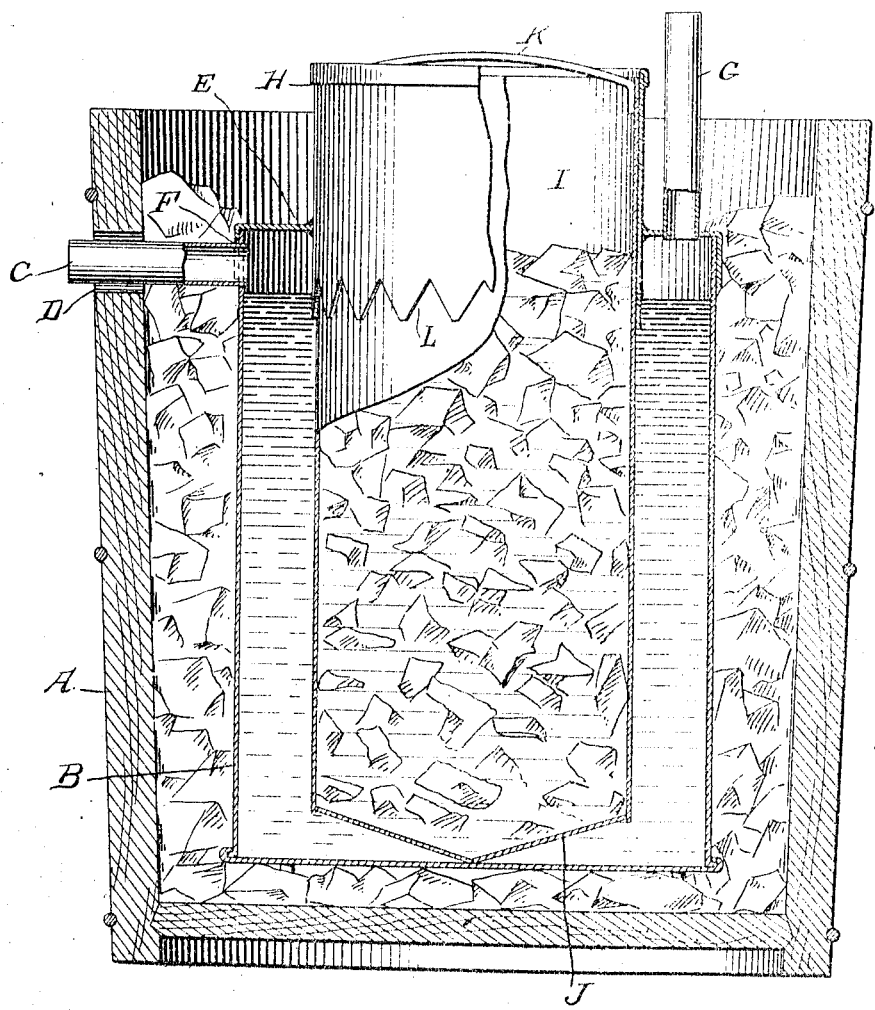

UNITED STATES PATENT OFFICE.

GEORGE W. POILLON, OF CHAPPAQUA, NEW YORK, ASSIGNOR, BY DIRECT AND MESNE ASSIGNMENTS, OF ONE-FOURTH TO REGINALD HALLADAY AND MALCOLM S. MacKAY, OF ENGLEWOOD, NEW JERSEY, AND ONE-FOURTH TO A. H. DYETT, OF NEW YORK, N. Y.

ICE-CREAM FREEZER.

954,411.        Specification of Letters Patent.        Patented Apr. 5, 1910.

Application filed March 2, 1908. Serial No. 418,658.

*To all whom it may concern:*

Be it known that I, GEORGE W. POILLON, a citizen of the United States, residing at Chappaqua, in the county of Westchester and State of New York, have invented certain new and useful Improvements in Ice-Cream Freezers, of which the following is a specification, reference being had to the drawing accompanying and forming part of the same.

My invention relates to ice cream freezers, and has for its chief object to provide an apparatus of simple and inexpensive construction by which the prepared material can be "frozen" with practically no attention after the material is placed in the freezer.

A further object is to provide a freezer which can be conveniently used as a packing receptacle to keep the cream frozen, provision being made for automatically refreezing the cream in case it should partially melt.

To these and other ends the invention consists in the novel features of construction, arrangements of parts, and combinations of elements hereinafter described, and more particularly pointed out in the appended claims.

The invention will be readily understood from a description of the preferred embodiment, which is illustrated in the annexed drawing, wherein the device is shown in vertical section.

The outer receptacle, designated by A, is preferably composed of wood or other material of low heat-conductivity, as is customary. Within the receptacle A is the cream can B, leaving a comparatively narrow annular space, say an inch or two in width from the can to the inner surface of the outer receptacle A. Near the top of the cream can is a lateral air-inlet pipe C, extending through a suitable aperture D in the receptacle A. On the cream can is a removable cover E, having its flange notched, as at F, to receive the air inlet pipe and provided near its opposite edge with a vertical air-outlet pipe G. The cover is also formed with a central aperture of circular form, and fixed therein is a vertical sleeve or holder H. Positioned centrally in the cream can by this sleeve is an ice-can I, having its bottom J pointed or conical in form and having at its top a handle K by which it may be readily withdrawn from the sleeve H and replaced therein when desired. The ice can I and sleeve H fit closely, and the lower edge of the latter is serrated, as indicated at L.

The method of using the freezer will now be readily understood. The cream can being set in the outer receptacle and the space between the two filled with the usual ice and salt mixture, the prepared cream is placed in the cream can and the cover placed thereon. The ice can, containing a freezing mixture of ice and salt, is now shoved down into the cream can, thus causing the cream to rise in the annular space between the two cans or chambers. Being thus confined to a narrow annular space the cream is exposed to the freezing mixtures over a considerable area in proportion to its volume, and hence loses its heat rapidly through the walls of the two chambers, which are preferably made of tin plate or similar sheet metal. In the course of twenty or thirty minutes the ice can is withdrawn, when it will usually be found that the cream has begun to congeal, especially in the lower part of the can, as can readily be ascertained by means of a spoon or other implement. The congealed portions are scraped off and mixed with the rest of the cream, after which the ice can or chamber is replaced. In the course of twenty minutes to a half-hour longer the cream will, on removal of the ice chamber, be found to be thoroughly congealed, but if not stiff enough the ice chamber can be replaced until the desired consistency is attained. In withdrawing the ice can it should be given a slight rotary motion, thereby causing the frozen cream adhering to the can to be scraped off by the serrated edge of the sleeve H. When the cream is frozen as hard as desired it is scraped off the sides of the cream can or chamber and packed down in the bottom of the chamber, and the ice chamber is replaced, but not forced down into the frozen cream, so that its pointed lower end merely rests on the top of the cream. In this condition the cream can be kept unmelted for several hours without attention. If, however, it begins to melt, the softening will occur at the top, since the bottom and sides of the cream chamber are surrounded by ice; but as the cream softens at the top the ice can, by reason of its pointed end and the weight of the freezing mixture contained in the can sinks down into the softening cream, thereby exposing more freezing surface to the cream and causing it to harden again. This re-freezing keeps pace automatically with the melting, so that although the ice chamber may have forced its way well into the mass of cream, the latter will be found to be stiff practically as long as any unmelted ice remains in the ice chamber.

I have found by a number of practical experiments that the ventilating pipes, as C, G, accelerate the freezing of the cream considerably. Thus I have found that a quantity of cream which, in a freezer with ventilating pipes, can be frozen in an hour or less, requires as much as two hours if no ventilation is provided. I am not prepared to explain definitely the reasons for this effect, but it seems to depend upon the air in the cream chamber above the cream. When the cream is placed in the can the air therein is of course at the temperature of the surrounding atmosphere, and is much above the freezing point. This air, if confined in the chamber, seems to give up its heat very slowly, and, as its temperature falls, may even absorb heat from the cover E, which is in contact with the atmosphere. But be that as it may, I have found that with the pipes C, G, provided, the air, as soon as the cover is in place on the cream chamber, begins to escape through the vertical pipe G, while fresh air enters through the pipe C. The air flowing in, however, is thoroughly chilled in its passage through the pipe C, so that the original body of comparatively warm air above the cream is soon replaced by cold air. This circulation is kept up as long as the temperature of the cream is much above the freezing point, and appears to cease altogether when the freezing begins. In order to insure that the air entering through the pipe C shall be thoroughly chilled, the pipe should be surrounded with ice, as shown. I have also found that somewhat better results are obtained by making the inlet pipe about twice the capacity of the outlet pipe, while the latter should extend well above the top of the outer receptacle A.

I prefer to make the cream and ice chambers cylindrical in form, and also prefer to have their sizes proportioned about as shown. For making a quart of ice cream I have used, with good results, a cream chamber about six inches in diameter and seven and a half inches high, and the ice chamber four inches in diameter and nine inches high, measuring from the apex of the bottom. The outlet air pipe used with this freezer was about three-eighths of an inch in diameter and the inlet pipe about a half-inch in diameter.

It is to be understood of course that the device herein specifically described is merely the preferred form of my invention, which may be embodied in various forms without departure from its proper scope as defined by the appended claims.

What I claim is:

1. In an ice-cream freezer, the combination of a cream chamber; a removable closure on the upper end thereof, said closure being provided with a central opening; a sleeve around said opening, extending below the closure and having its lower edge serrated; and an ice chamber adjustable vertically in said sleeve and having its bottom pointed or conical in form, as set forth.

2. In an ice-cream freezer, the combination of a cream chamber, an ice chamber of smaller diameter positioned in the cream chamber so as to leave an annular space between the two, and a laterally extending air-inlet pipe and an upwardly extending air-outlet pipe in communication with the interior of the cream chamber at the top thereof, the laterally extending pipe being positioned so as to be subjected directly to the refrigerant in the outer ice-chamber, whereby the air admitted through said horizontal pipe will be chilled before reaching the cream chamber, as set forth.

3. In an ice-cream freezer, the combination of a cream chamber of cylindrical form; an outer ice chamber surrounding the cream chamber an air-inlet pipe extending laterally from the top of the cream chamber across the outer ice-chamber whereby to be exposed directly to the refrigerant therein; a closure for the cream chamber, having a central opening; a sleeve around said opening; an ice chamber of smaller diameter than the cream chamber, arranged for adjustment in said sleeve; and an air-outlet pipe extending upwardly from the closure of the cream chamber; as set forth.

4. In an ice-cream freezer, the combination of an outer receptacle for a freezing medium; a cream chamber in said receptacle, provided with a lateral air-inlet pipe extending through the wall of the receptacle and in position to be subjected directly to the freezing medium in said receptacle; a closure for the cream chamber, having an upwardly extending air-outlet pipe near its edge and having a central opening; a sleeve around the said opening; and an ice chamber extending through the sleeve into the cream chamber and removable therefrom; as set forth.

GEORGE W. POILLON.

Witnesses:
JOHN C. KERR,
M. LAWSON DYER.